United States Patent [19]
Kidwell

[11] Patent Number: 5,164,605
[45] Date of Patent: Nov. 17, 1992

[54] FIBER OPTIC DISPLACEMENT SENSOR USING FIBER OPTIC COIL

[75] Inventor: John J. Kidwell, Louisville, Ohio

[73] Assignee: The Babcock & Wilcox Company, New Orleans, La.

[21] Appl. No.: 745,032

[22] Filed: Aug. 14, 1991

[51] Int. Cl.⁵ .............................................. G01N 15/06
[52] U.S. Cl. ............................ 250/577; 250/227.16; 250/900; 73/293
[58] Field of Search ...................... 250/227.16, 227.21, 250/227.25, 577, 900; 73/293; 340/619, 623; 385/32

[56] References Cited

U.S. PATENT DOCUMENTS

| | | | |
|---|---|---|---|
| 4,038,650 | 7/1977 | Evans et al. | 73/293 |
| 4,287,427 | 9/1981 | Scifres | 250/577 |
| 4,633,711 | 1/1987 | Hipple et al. | 73/293 |
| 4,745,293 | 5/1988 | Christensen | 73/293 |
| 4,764,471 | 8/1988 | Ripka | 435/255 |
| 4,860,586 | 8/1989 | Miers et al. | 250/227.16 |
| 4,870,292 | 9/1989 | Alpert et al. | 73/293 |
| 4,891,511 | 1/1990 | Reed | 250/226.16 |
| 4,942,306 | 7/1990 | Colbourne | 250/577 |
| 4,994,682 | 2/1991 | Woodside | 250/577 |
| 5,038,620 | 8/1991 | Rogers, Jr. | 250/227.16 |

FOREIGN PATENT DOCUMENTS 0302122 12/1989 Japan ................................. 250/227.16

Primary Examiner—David C. Nelms
Assistant Examiner—S. Allen
Attorney, Agent, or Firm—Vytas R. Matas; Robert J. Edwards; Daniel S. Kalka

[57] ABSTRACT

A fiber optic microbend sensor employs a resilient coil (12) with an optical fiber (10) positioned therein. The coil (12) has a predetermined length and pitch. An optical signal is applied to the optical fiber (10) with the coil (12) interrogating a parameter. Any movement of the coil (12) modulates the optical signal transmitted along the optical fiber (10). Detecting means (32) measures the modulations of the optical signal for characterization of the parameter.

20 Claims, 5 Drawing Sheets

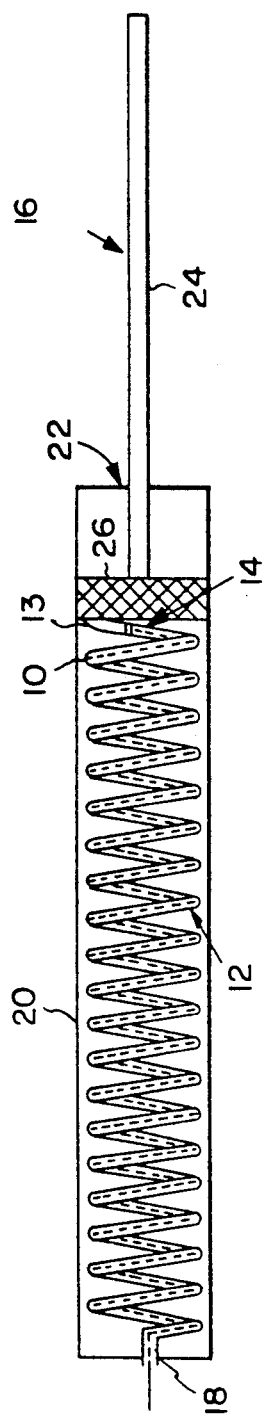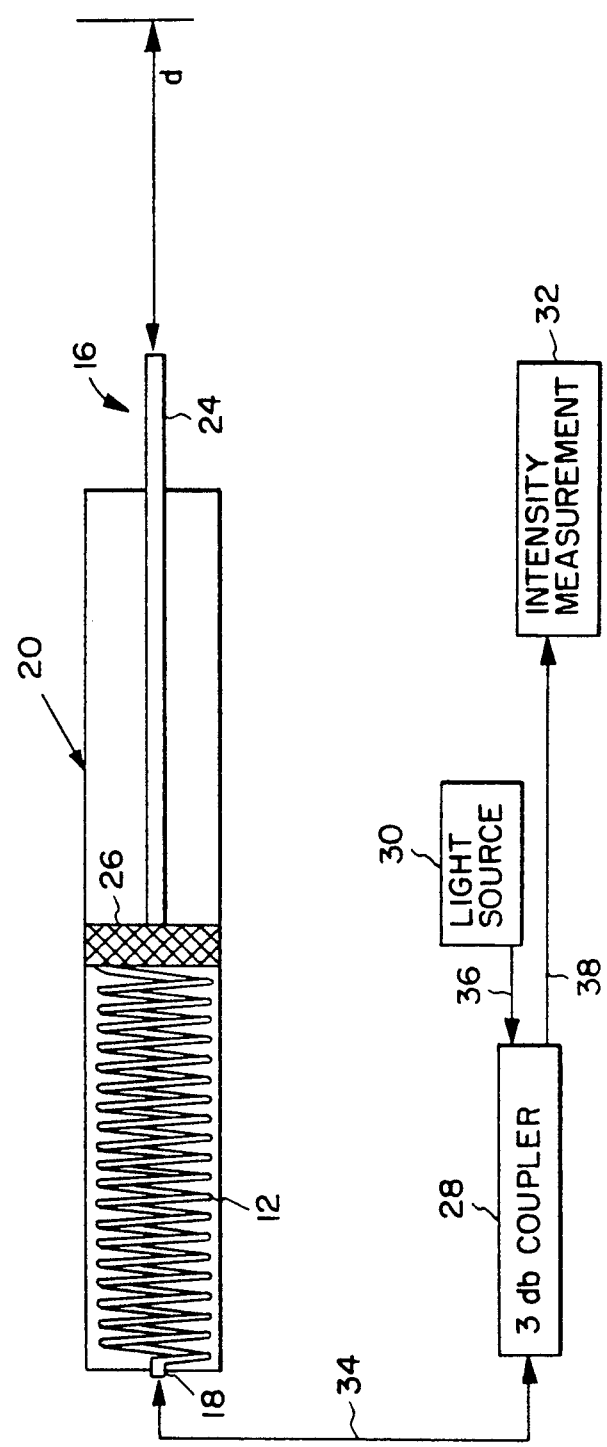
FIG. 1a
FIG. 1b

FIBER OPTIC DISPLACEMENT SENSOR USING FIBER OPTIC COIL

BACKGROUND OF THE INVENTION

1. Field of the Invention

The present invention relates in general to a fiber optic displacement sensor, and in particular, it is directed to a fiber optic microbend displacement sensor employing a coiled optical fiber exposed to a parameter. A change in the parameter causes a change in the coil length and pitch which effects a light throughput to change in corresponding manner.

2. Description of the Related Art

There are displacement sensors currently available based on a wide variety of electrical sensing techniques. These include variable reluctance, eddy current and linear variable differential transformers (LVDT).

While these existing techniques are used successfully for measuring displacement, they employ electrical fields and voltages in the sensors that may be suseptible to signal degradation depending on the physical and electrical environment.

Microbend sensors in general offer the advantages of being simple, low cost, immune to electro-magnetic interference, operable over wide ranges of temperature, pressure and other environmental conditions. In addition, good performance can be obtained with relatively simple opto-electronics. Current fiber optic microbend sensor technology requires additional external structures such as corrugated plates. These additional external structures add costs in terms of material and time as well as being suitable only for certain applications.

U.S. Pat. No. 4,891,511 discloses a fiber optic microbend sensor employing braided fibers. The arrangement of the fibers provides length dependent microbending losses from the interaction of the fibers themselves.

There are currently available optical fluid level sensors based on an array of individual optical fibers with the tip of each fiber situated at a fluid level interval for measurement. These types of sensors utilize reflection and/or refraction as taught in U.S. Pat. Nos. 4,764,671; 4,942,306; 4,633,711; 4,038,650; 4,870,292; 4,745,293; and 4,994,682.

There is a need for a fiber optic microbend sensor which is simple, accurate, and readily attachable to structures with several applications. It should not require precision in the attachment and be economical.

SUMMARY OF THE INVENTION

The present invention solves the aforementioned problems with the prior art as well as others by providing a fiber optic microbend sensor employing a resilient coil having a predetermined length and pitch with an optical fiber situated therein. A light source applies an optical signal to the optical fiber and the coil moves in response to a change in a sensed parameter which causes a modulation in the optical signal transmitted along the optical fiber. Detecting means measure the modulation of the optical signal transmitted through the optical fiber for sensing the parameter.

Accordingly, an aspect of the present invention is to provide a fiber optic microbend sensor for measuring displacement.

Another aspect of the present invention is to provide a fiber optic microbend sensor for measuring fluid level.

Still another aspect of the present invention is to provide a fiber optic microbend sensor which is simple in design, rugged in construction, and economical to manufacture.

The various features of novelty characterized in the invention are pointed out with particularity in the claims annexed to and forming a part of this disclosure. For a better understanding of the invention, and the operating advantages attained by its uses, reference is made to the accompanying drawings and descriptive matter in which a preferred embodiment of the invention is illustrated.

BRIEF DESCRIPTION OF THE DRAWINGS

In the drawings:

FIG. 1(a) is a sectional schematic illustration depicting a portion of an embodiment of the present invention in an expanded position;

FIG. 1(b) is similar to FIG. 1(a) depicting the embodiment in a contracted position;

DESCRIPTION OF THE PREFERRED EMBODIMENTS

Figure 2A:
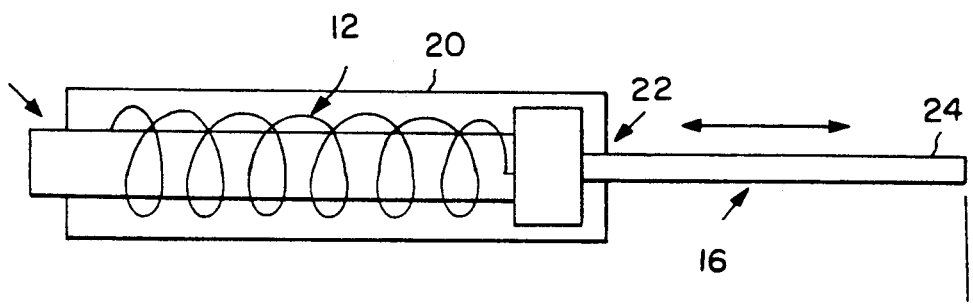
FIG. 2(a) is a sectional schematic illustration depicting another embodiment of the present invention in an expanded position.

Referring to the figures generally, wherein like numerals designate the same element or like features throughout the several views, and to FIGS. 1(a) and (b), in particular, there is illustrated a fiber optic microbend displacement sensor according to the present invention. A multi-mode optical fiber (10) is inserted in a very small tube and formed into a coil (12). The coil (12) may be fabricated using a plastic tube with heat to form the coil (12). Alternatively, an optical fiber (10) may be employed by itself with a suitable buffer coating to form a coil (12), for example, a plastic optical fiber. The optical fiber (10) at one end (13) of the coil (12) is positioned facing reflecting means (14) such as a mirror or a reflective coating directly on the optical fiber (10). Other reflecting means include total Internal Reflection corner cubes or Fresnel reflection. The reflecting means end (13) of the coil (12) is attached to a movable plunger (16) that is exposed to a parameter to be sensed.

The other end (18) of the coil (12) is fixedly secured so as to maintain the coil shape. In FIG. 1, the end (18) of the coil (12) is attached to a housing (20). Housing (20) surrounds the coil (12) and the head (26) of the movable plunger (16). Housing (20) contains an aperture (22) to allow the shank (24) of the plunger (16) to freely move in response to a parameter such as displacement, pressure, ect. The head (26) of the movable plunger (16) by way of linear motion causes the coil (12) length and pitch to change in a response to a displacement in a parameter. The end of the optical fiber (18) is connected to a light splitting means (28) such as 3 db coupler where it is directed to a light source (30) and detecting means (32) with known optical splices (34, 36, 38).

Suitable light sources (30) include a light emitting diode (LED), laser, or laser diode, or any other source of light. The detection means (32) may include any means of detecting changes in the intensity of an optical signal such as a photodiode. Simple analog intensity detection means (32) allows the measurement of changes in intensity caused by the flexure of the coil (12) in response to a change in a parameter. The opto-electronics of the detection means (32) can include a log-ratio amplifier as disclosed in U.S. Pat. No. 4,860,586.

The light throughput of the coil (12) is a function of the overall coil length and individual coil pitch. Linear motion of the plunger (16) in response to a change in a parameter in the direction (d) causes the length of the coil (12) and pitch to change. This causes the light throughput to change. By varying the coil diameter, stiffness and length, the sensor's sensitivity and overall range is changeable.

Figure 3:
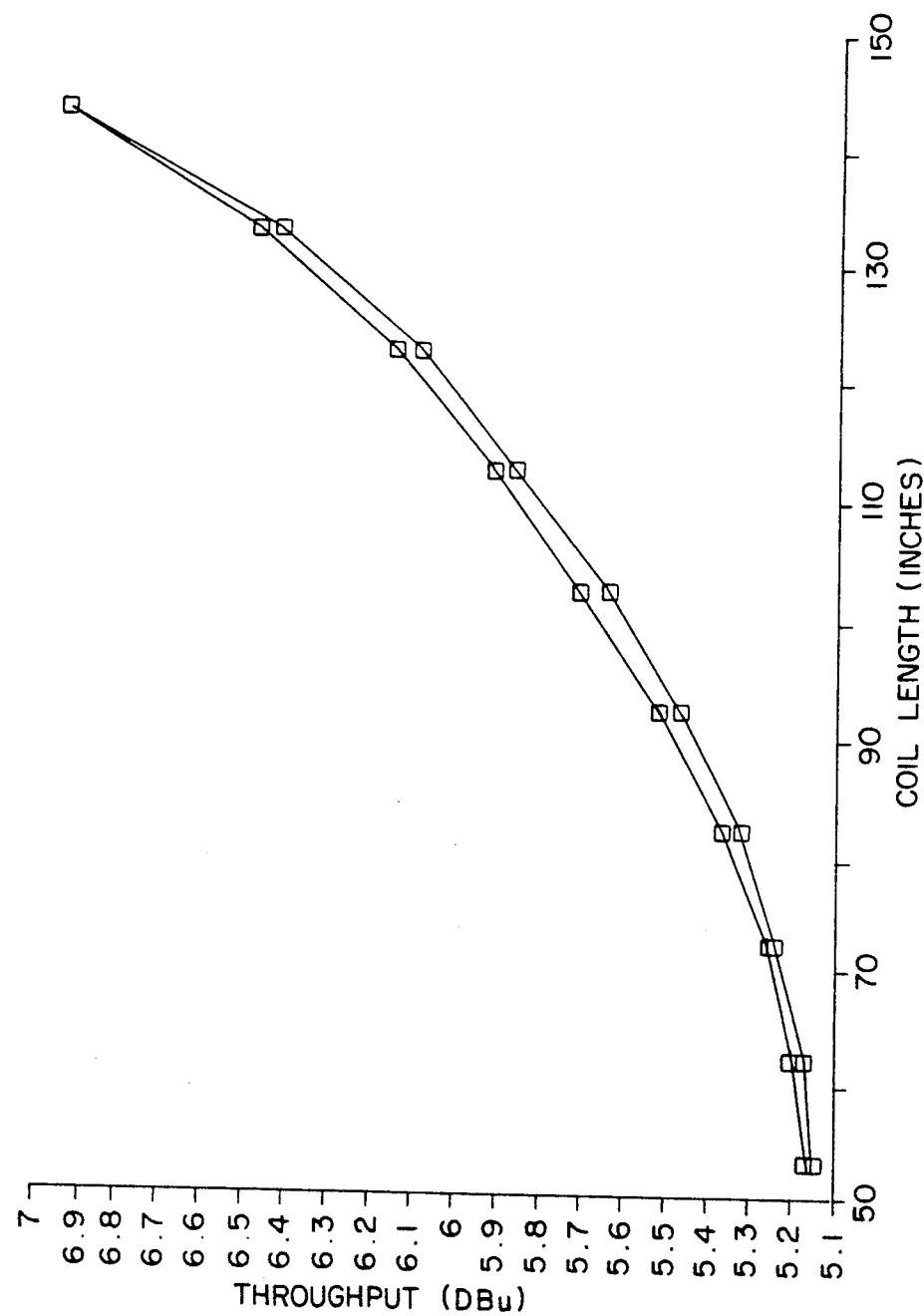
FIG. 3 is a graph plotting throughput (DBu) versus coil length in inches.

In one example, a coil was fabricated using plastic fiber and heat formed. The nominal diameter of this sensor was 0.45 inches with 120 coil revolutions. The throughput was measured over a length of 52 inches to 142 inches as stretched. A plot of the data obtained is shown in FIG. 3.

Figure 2B:
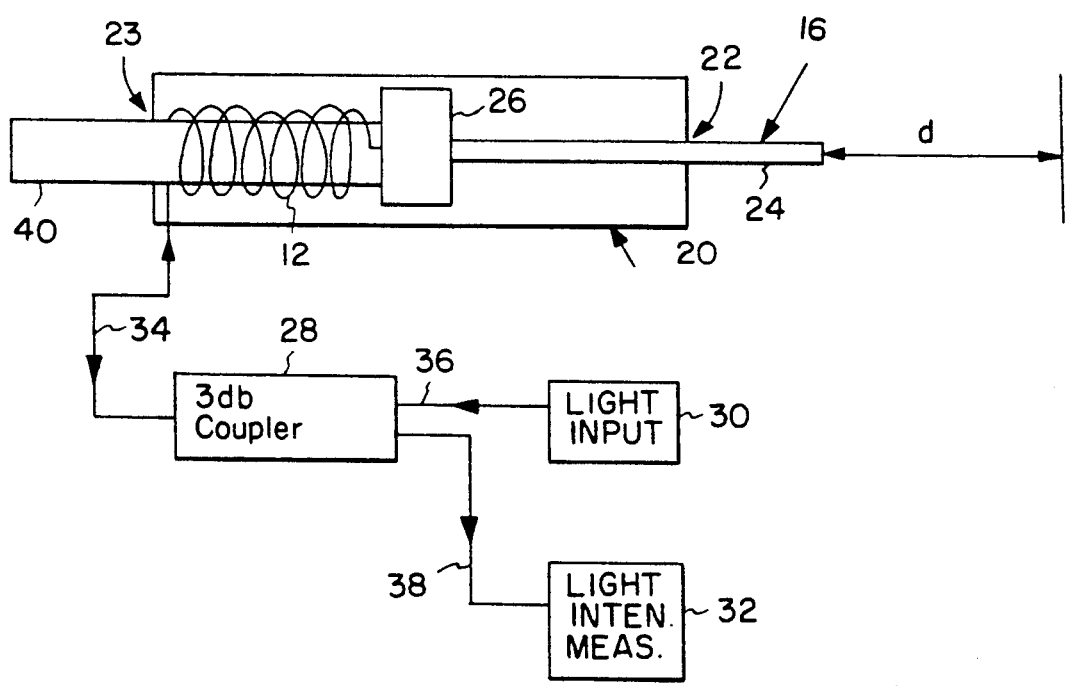
FIG. 2(b) is similar to FIG. 2(a) depicting the embodiment in a contracted position.

Now referring to FIGS. 2(a) and (b), there is shown a fiber optic microbend sensor similar to that in FIG. 1 except for a coil support (40) positioned inside coil (12) within the housing (20). The coil support (40) acts in concert with the housing (20) to provide a means for guiding and/or vibration damping of the coil (12) from an expanded position shown in FIG. 2(a), to a retracted position as shown in FIG. 2(b). The coil support (40) may be an integral part of the housing (20), or it can be moved in a corresponding opposite manner through an aperture (23) axially opposite aperture (22) in motion with the movable plunger (16) as depicted in FIG. 2.

Fluids, such as a silicon oil, may also be introduced in the housing (20) to provide vibration damping to the coil in high vibration environments.

Figure 4A:
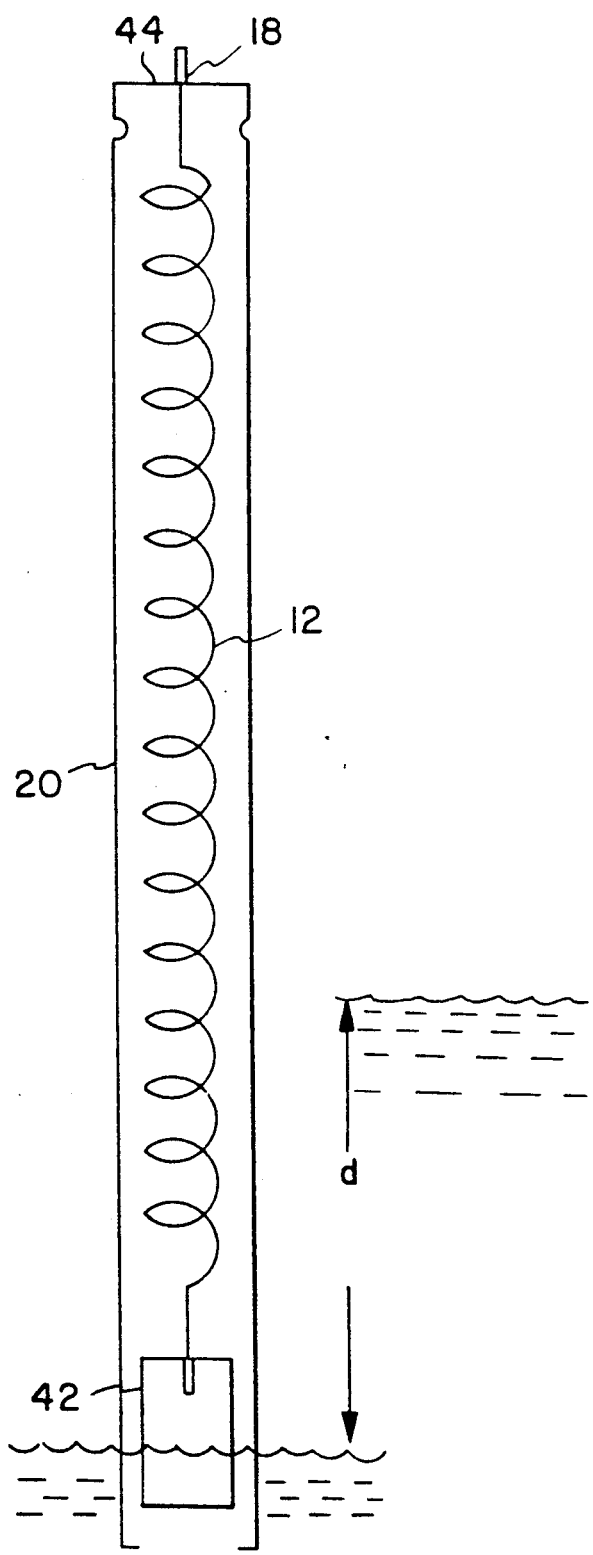
FIG. 4(a) is a schematic illustration of still another embodiment of the present invention in an expanded position.
Figure 5:
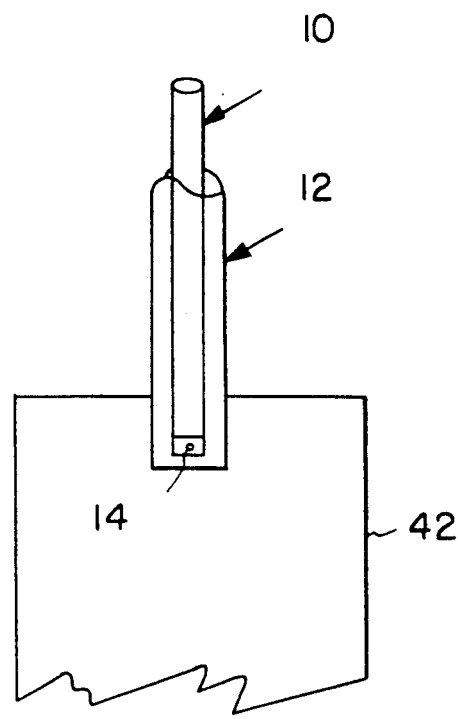
FIG. 5 is a view of section V—V in FIG. 4(b).
Figure 4B:
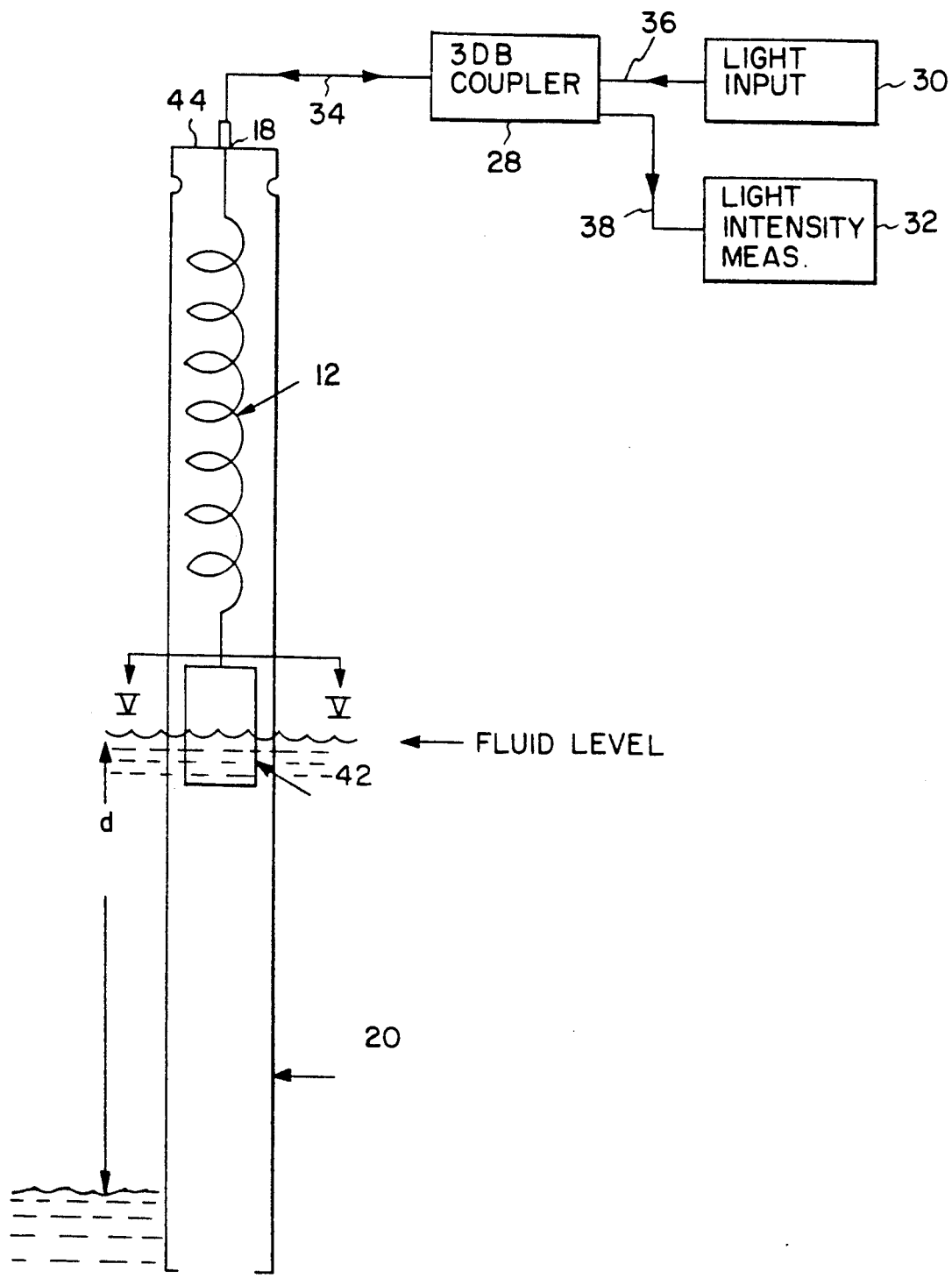
FIG. 4(b) is similar to FIG. 4(a) depicting a contracted position.

Next referring to FIGS. 4(a) and (b), there is shown a particular application of the present invention as a fiber optic microband fluid level sensor. This embodiment is similar to that shown in FIGS. 1(a) and (b). There is a float (42) attached to one end (13) of the coil (12). The optical fiber (10) has reflective means (14) sealed in and attached to the float (42). The float (42) as well as coil (12) are positioned inside a guide tube or housing (20) with the other end (18) of the coil being attached to the top (44) of the guide tube (20). The optical fiber (10) is connected to a light splitting means (28), light source (30), and detecting means (32) as previously discussed. This embodiment operates in a similar fashion to that previously explained with the light throughput in the coil (12) being a function of overall coil length and individual coil pitch. As illustrated in FIG. 4, it can be seen that as the float position changes the coil pitch changes which causes light throughput to change. By varying the coil diameter, stiffness and length, the sensor's sensitivity and range is variable.

The sensor of the present invention incorporates all the inherent advantages of optical sensors in general such as noise immunity. The sensor requires only a single optical channel and either broad band or narrow band sources are usable. Therefore, simple optical sources such as LEDs can be used as the light source and simple analog intensity detection means can be used to measure the change in intensity. Other advantages include the use of the sensor in high temperature and pressure, cryogenic, corrosive and hazardous environment. Additionally, the output of the sensor provides a continuous analog indication of both static and dynamic displacements. The coil can be situated in a fashion to sense various parameters such as temperature, pressure or displacement.

While specific embodiments of the invention have been shown and described in detail to illustrate the application and principles of the present invention, it will be understood that the invention may be embodied otherwise without departing from such principles. As mentioned earlier, an example is the use of fluids in the housing to provide vibration damping either alone or in conjunction with the guide support (40) in high vibration environments.

Another example of such a modification is to form the coil in a double helix with one end of the optical fiber providing a light source with the light propagating through the optical and exiting the other end to a photodetector.

I claim:

1. A fiber optic microbend sensor, comprising:
   a resilient coil having a predetermined length and pitch with an optical fiber situated therein;
   means for applying an optical signal to said optical fiber;
   means for moving said coil in response to a parameter to cause a modulation in the optical signal transmitted along said optical fiber; and
   means for detecting modulations of the optical signal transmitted through said optical fiber.

2. A fiber optic sensor as recited in claim 1, further comprising means for guiding movement of said coil along a predetermined path to prevent excessive distortion thereof.

3. A fiber optic sensor as recited in claim 2, wherein said guiding means comprises a coil support located inside said coil.

4. A fiber optic sensor as recited in claim 2, wherein said guiding means comprises a housing surrounding said coil.

5. A fiber optic sensor as recited in claim 2, wherein said guiding means comprises a tube with said coil situated therein.

6. A fiber optic sensor as recited in claim 1, further comprising reflecting means attached to said optical fiber for returning the optical signal transmitted therethrough.

7. A fiber optic sensor as recited in claim 5, wherein said reflective means is located at one end of said optical fiber in said coil.

8. A fiber optic sensor as recited in claim 5, further comprising a float attached to one end of said coil with the other end of said coil being attached to a cover on said tube.

9. A fiber optic sensor as recited in claim 8, further comprising reflecting means attached to said optical fiber for returning the optical signal transmitted therethrough.

10. A fiber optic sensor as recited in claim 9, wherein said tube is vertically oriented with said float being positioned at the lower end.

11. A fiber optic sensor as recited in claim 2, wherein said moving means includes a plunger having a shank terminating at a head, said shank being exposed to a parameter with said head moving said coil in response thereto.

12. A fiber optic sensor as recited in claim 11, wherein said guiding means comprises a housing surrounding said coil and said head of said plunger, said housing having an aperture constructed so as to receive said shank of said plunger.

13. A fiber optic sensor as recited in claim 12, wherein said guiding means includes a coil support situated inside said coil within said housing.

14. A fiber optic sensor as recited in claim 13, further comprising reflecting means at one end of said optical fiber for returning the optical signal transmitted therethrough.

15. A fiber optic sensor as recited in claim 1, wherein said coil is plastic.

16. A fiber optic sensor as recited in claim 1, wherein said optical signal applying means includes a light source.

17. A fiber optic sensor as recited in claim 16, wherein said optical signal applying means further includes an optical coupler.

18. A fiber optic sensor as recited in claim 1, wherein said detecting means comprises a photodetector.

19. A fiber optic sensor as recited in claim 12, further comprising sealing means for said shank of said plunger for sealing a fluid therein to provide vibration damping.

20. A fiber optic sensor as recited in claim 4, further comprising a fluid in said housing for providing vibration damping.

* * * * *